United States Patent Office 2,955,702
Patented Oct. 11, 1960

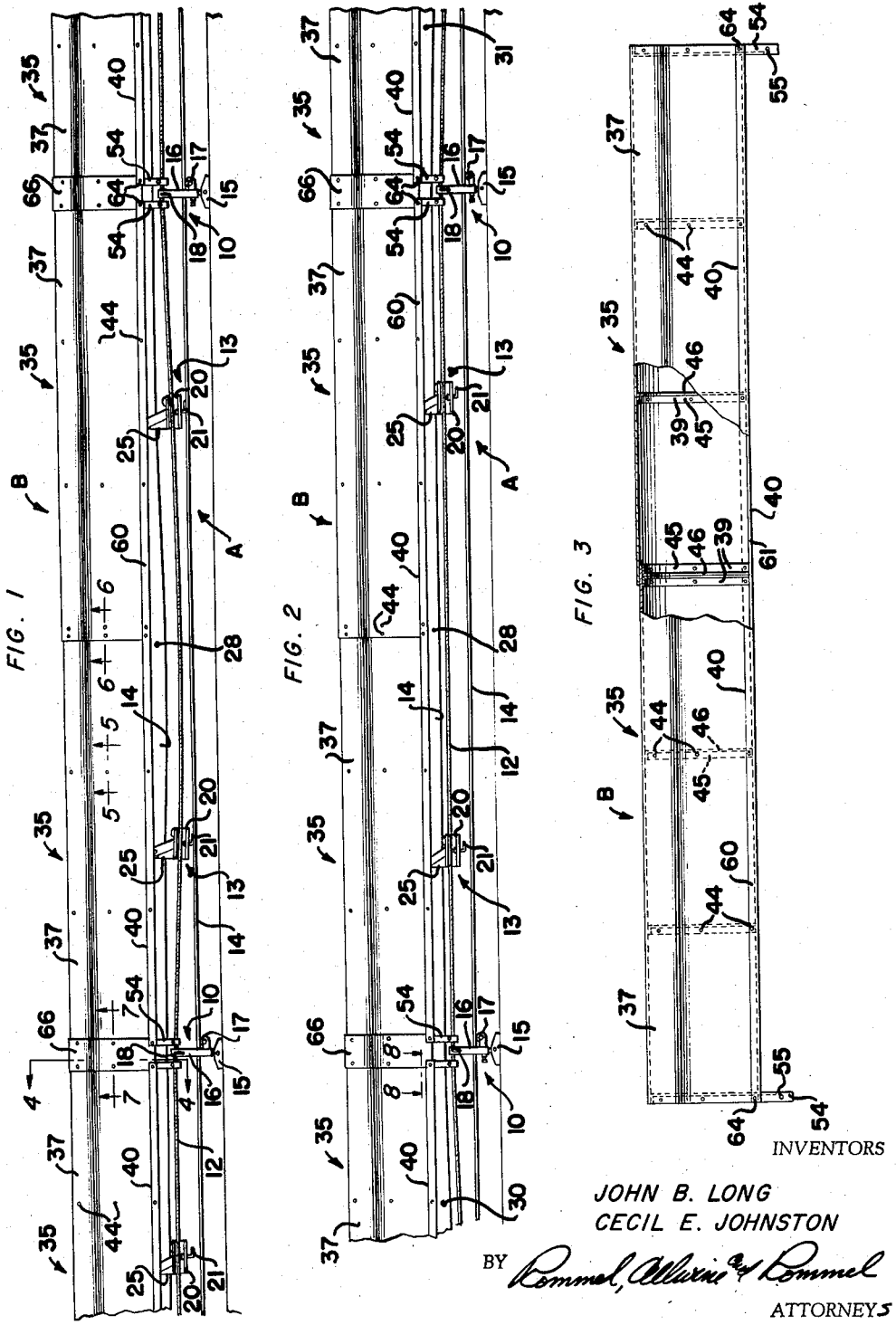
Oct. 11, 1960    J. B. LONG ET AL    2,955,702
BELT CONVEYOR COVER
Filed Oct. 24, 1958    2 Sheets-Sheet 1
INVENTORS
JOHN B. LONG
CECIL E. JOHNSTON
BY
ATTORNEYS

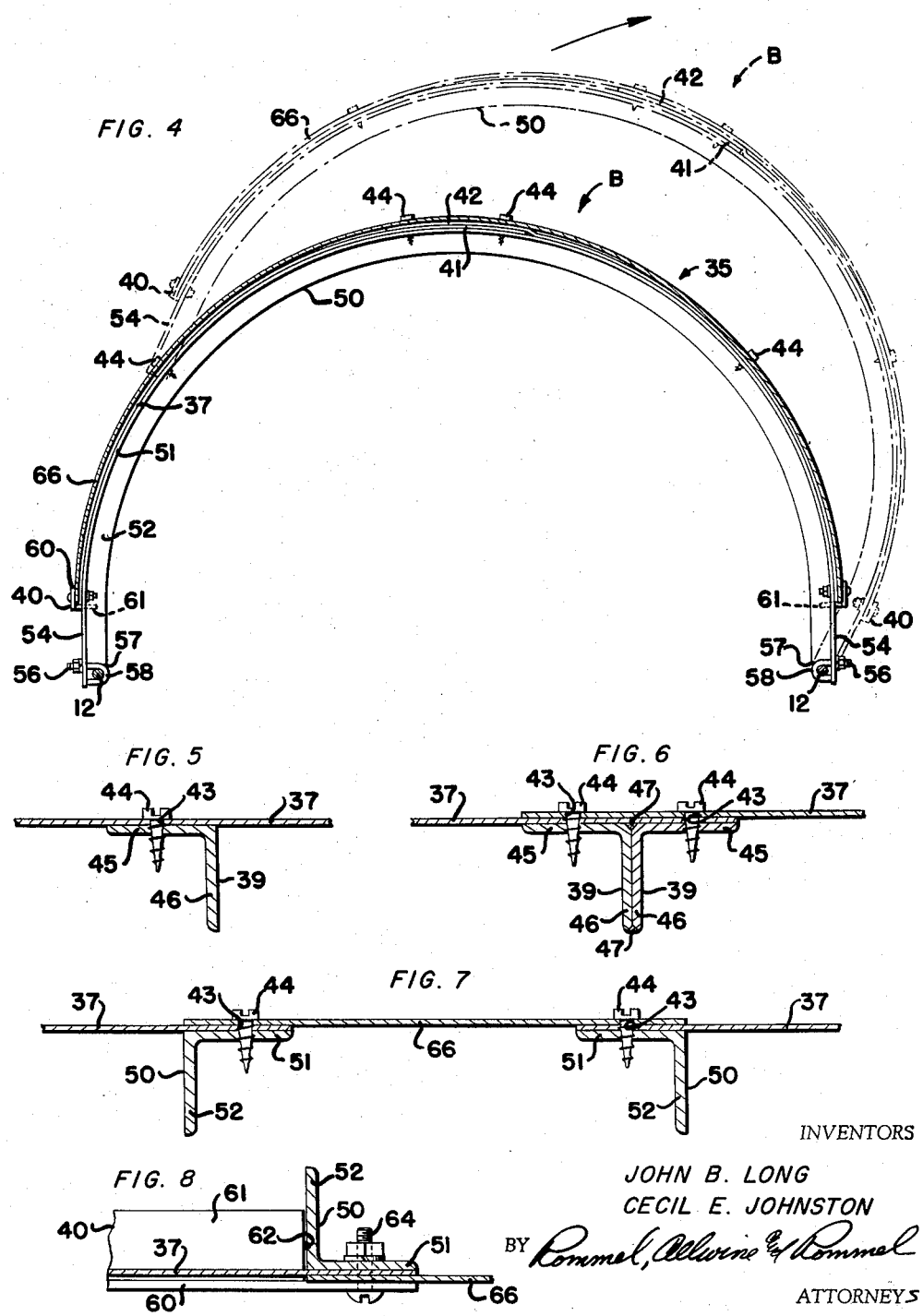

2,955,702

BELT CONVEYOR COVER

John B. Long and Cecil E. Johnston, Oak Hill, W. Va., assignors, by mesne assignments, to Marmon-Herrington Company, Inc., Indianapolis, Ind., a corporation of Indiana Filed Oct. 24, 1958, Ser. No. 769,487

8 Claims. (Cl. 198—204)

This invention relates generally to covers for belt conveyors, and more particularly to covers for belt conveyors of the type in which the load bearing stretch of the belt is supported upon conveyor roller units that are in turn supported upon spaced flexible strands of wire or rope.

In the provision of belt conveyors for transporting material for substantial distances, such as for instance in the conveying of coal from a coal mine, the belt conveyors are exposed to the elements, such as sun, rain, etc., these elements having a deleterious effect upon the belt and diminish the efficiency of transfer of material upon the belt. It has been found that the exposure of the usually darkly colored belting to the extreme heat of the sun will result in absorption and holding of the heat by the belt, causing rapid deterioration of the belt. So far as the efficiency of transfer by a belt conveyor exposed to the elements is concerned, it has been found that if the belt conveyor is positioned to convey material up a slight incline, without a cover, that a heavy fall of rain will deposit sufficient water on the belt to cause the material to be washed downhill rather than to be conveyed to its desired location.

The primary object of this invention is the provision of compact cover for belt conveyors that can be mounted directly upon the belt conveyor, enabling the use of the ground surface area surrounding the belt conveyor for other purposes.

A further object is the provision of a cover for belt conveyors having prefabricated cover sections, permitting assemblage of the cover at the site of its erection and eliminating the difficult problem in shipping and storing the covers prior to shipment.

A further object is the provision of a cover for belt conveyors that is made up of a plurality of easily fabricated parts that may be produced in volume and are easily assembled, providing a low cost, highly effective cover.

The problem of providing a cover for belt conveyors is particularly apparent with respect to belt conveyors that are supported upon spaced flexible strands of wire or rope. In such belt conveyors the flexible strands flex according to the movement of the load along the conveyor belt and the standards supporting the strands have an inherent walking movement, therefore the cover must be of light weight material so that it can be supported upon the strands without interfering with the flexibility thereof; it must possess considerable flexibility; and it must be mounted upon the flexible strands so that it will not become displaced from its position and will not interfere with the movement of the flexible strand supporting standards. It is thus one of the primary objects of this invention to provide a cover for belt conveyors that is supported upon spaced flexible strands of wire or rope and possesses the above attributes.

Other objects and advantages will be apparent during the course of the following detailed description, taken in connection with the accompanying drawings, forming a portion of this specification and in which drawings:

Fig. 1 is a side view of our improved cover, mounted upon a strand supported belt conveyor and showing a non-uniform load being transported by the belt.

Fig. 2 is a side view similar to Fig. 1, but showing the non-uniform load transported to a different position by the belt.

Fig. 3 is an enlarged side elevation, partly in section, of a length of our improved cover.

Fig. 4 is an enlarged transverse sectional view taken substantially on the line 4—4 of Fig. 1.

Figs. 5, 6 and 7 are enlarged fragmentary sectional views taken substantially on the lines 5—5, 6—6 and 7—7 of Fig. 1.

Fig. 8 is an enlarged longitudinal sectional view taken substantially on the line 8—8 of Fig. 2.

In the drawings, wherein for the purpose of illustration is shown a preferred form of the invention, and wherein similar reference characters designate corresponding parts throughout the several views, the letter A designates generally a strand supported belt conveyor upon which our improved cover B is mounted.

The belt conveyor A is more fully shown and described in the copending application Serial No. 700,444, inventors John B. Long and Jeff C. Clay, filed December 3, 1957, and copending application Serial No. 721,063, inventor John B. Long, filed March 12, 1958, and therefore only a very brief description thereof will be included in this specification.

The belt conveyor A generally comprises standards 10, spaced flexible strands or cables of wire or rope 12 mounted upon the standards 10, and conveying roller units or conveying idler assemblies 13 mounted upon the flexible strands or cables 12.

The standards 10 preferably comprise a base 15 to which is pivotally secured the upright tubular side members 16. These tubular side members 16 support a transverse return roller 17 for the belt 14 and are provided with a strand engaging clamp 18 at their uppermost ends.

The flexible strands 12 parallel each other for a distance slightly greater than the length of the load bearing stretch of the belt and are secured at their terminus to an eye which is firmly secured in place to the floor, as is well known in the art.

The conveying roller units or conveying idler assemblies 13 preferably comprise strand receiving side brackets 20 which are fixedly secured to the strands 12 as by the clamp 21. These side brackets support rollers 25 which carry the load bearing stretch of the belt 14.

Referring now to Figs. 1 and 2, it will be seen that in Fig. 1 the load is located at a position 28 upon the belt, with the result that the conveying roller units 13 to either side thereof are tilted downwardly toward the load and the flexible strands 12 have been depressed downwardly. In Fig. 2 the load has passed from its position 28 to a position 30 and a new load is positioned on the belt at 31.

The cover B preferably comprises a series of cover units 35 that are secured together in order to form an elongated cover longitudinally of the belt conveyor.

Each of these units 35 preferably comprises cover sheets 37, preferably of some light gauge rolled galvanized metal, mounted upon the arcuate struts 39 and having stringer angles 40 mounted along their lowermost edges. Each of the cover sheets 37 may comprise a single sheet rolled to substantially conform to the arc of the struts 39 or may be a single flattened sheet, the attachment of the sheets 37 to the struts 39 effectively providing the arcuate cover desired.

In Fig. 4 is shown another mode of fabrication of the cover sheets 37, the same comprising a pair of arcuate members 41 and 42 that are interconnected to form a unitary cover. These members may either be rolled to shape or applied as a flattened sheet in the same manner as the single sheet previously described.

The openings 43 are punched in the cover sheet, at predetermined intervals, and the self-tapping metal screws 44 are utilized to secure the cover sheets 37 to the struts 39.

The struts 39 form a frame for the cover sheets 37 and are preferably of an L-shaped configuration, having legs 45 and 46 and are rolled into an arc having a width slightly greater than the width of the belt to be covered. The legs 46 of the struts are positioned inwardly of the arc, giving the strut substantial rigidity with respect to pressures applied thereupon.

The usual spacing between standards 10 is twelve feet and, as the cover sheets 37 are each of approximately six feet in length, in order to permit facile handling and assemblage, two of the units 35 secured together and provided with strand engaging means at either end thereof will fall just short of spanning the distance between standards. This relationship places the cover supporting means adjacent to the standards 10, but spaced therefrom, thus supporting the cover upon the strands at a point of minimal deflection of the strands.

In joining the units 35 together, as shown in Fig. 6, two of the struts 39 are arranged so that the legs 46 thereof are in abutment, with the legs 45 thereof in the same plane. These struts 39 are then welded together, as by spot welds 47 and the sheets 37 overlapped and secured in an interconnected position by the self-tapping metal screws 44. It will be seen that if it is desired to shorten the overall length of the interconnected units, such as for the spacing of the standards 10 at a distance of less than ten feet from each other, that it will be relatively simple to further telescope the sheets 37.

Each of the units 35 is provided with a strut 50 at the end opposite the interconnected overlapping end above referred to. These units 50 include means for attaching the cover to and supporting the cover upon the flexible strands 12. The struts 50 are of an L-shaped configuration, having legs 51 and 52, and are similar to the struts 39. These struts 50 are provided with parallel vertically extending portions 54 at each end thereof for supporting the cover above the belt. The outermost end of each portion 54 is provided with an opening 55 that receives a hook bolt 56 for securing the struts 50 to the flexible strands 12. The inwardly extending legs 52 of the struts 50 are cut away, at the lowermost portion thereof, as at 57, in order to space these legs from the flexible strands 12. The hook bolts 56 are each provided with a leg 58 that hooks about the strand 12 in either loose clamping engagement or a tight clamping engagement, as will be subsequently described.

The stringer angles 40 are preferably of an L-shaped configuration, having legs 60 and 61, the leg 60 being secured along one side of the cover sheets 37 with the other leg 61 extending beneath the ends of the cover sheets 37, the leg 61 protecting the ends of the cover sheets from becoming bent. These stringer angles are primarily for protection, however, they do add some structural strength to the cover, as is obvious. These stringer angles 40 are preferably coextensive between the end struts 50 and the inwardly turned leg 61 is notched, as at 62, shown in Fig. 8, to permit fitting of the ends of the leg 60 over the strut 50. The stringers 40 are secured to the struts 50 as by stove bolts 64.

Spacer sheets 66 are secured to the spaced struts 50 of the adjacent units 35, disposed to either side of the standards 10, bridging the space between the cover sheets 37 and forming a continuous cover. In some instances of use it may be desirable to secure only one side of the spacer sheet 66 to one of the adjacent units 35 with the other end of spacer sheet 66 overlapping, but not secured to the other adjacent unit 35 for a purpose to be subsequently described. It is obvious that as many sections as are necessary to completely cover the entire length of the belt conveyor may be used.

When it is desired to have access to the belt, at a position beneath the cover, the hook bolts 56 along one side of the cover may be removed and the cover swung upwardly, into a position as shown in dot-and-dash lines in Fig. 4, utilizing the connection of the hook bolts 56 to the other side strand 12 as a pivotal axis.

In the attachment of the cover to the flexible strands it may be desirable to provide the hook bolts 56 in either a loose clamping engagement or tight clamping engagement with the flexible strands 12.

When it is desired to permit relative longitudinal flexure of the strands with respect to the cover throughout its length, the hook bolts 56 at only one end of each cover section 35 are disposed to tightly clamp the flexible strands 12 and secure the cover in its proper position, the hook bolts 56 at the other end thereof loosely engaging the flexible strands 12 as shown in Fig. 4, so that longitudinal movement of the strands is permitted with respect to the cover. When the cover is thus supported upon the strands the spacer sheets 66 will be secured to only one of the adjacent cover sections 35, the spacer sheet overlapping the other adjacent cover section 35 so that the adjacent cover sections can shift longitudinally with respect to each other.

In some applications of a strand supported conveyor it has been found desirable to provide maximum longitudinal stability of the strands, limiting flexure thereof to vertical movement only. In such instances each of the hook bolts 56 will be tightly clamped to the flexible strands 12. In this fixed position the cover provides a brace for the strands so that the strands are substantially rigidly longitudinally stabilized. This longitudinal stabilization of the flexible strands substantially eliminates the undesirable rocking and shifting of the standards that has heretofore been present in belt conveyors of this type.

It is obvious that various other interconnections may be made between the cover and the flexible strands, such as having each of the hook bolts 56 loosely engaging the flexible strands 12 so that the flexible strands have free longitudinal movement with respect to the entire cover; or the hook bolts 56 of alternate cover units tightly clamping the flexible strands, etc.; and that the various spacer sheets may be secured to one or both of the adjacent units.

Various changes may be made to the form of the invention herein shown and described without departing from the spirit of the invention or the scope of the following claims.

We claim:

1. In combination with a belt conveyor and means for supporting the same including spaced flexible strands; a continuous cover extending longitudinally over said belt conveyor, said continuous cover including a plurality of cover units; interconnecting means for securing said cover units together, at least certain of said interconnecting means comprising means for permitting relative flexure of the cover units adjacent thereto; support means for attaching said cover units to said flexible strands, said support means being fixedly secured to said cover units, with certain of said support means being fixedly secured to said flexible strands and maintaining the cover units in juxtaposition with respect to said belt conveyor, and with the remainder of said support means loosely engaging said flexible strands and permitting movement of said flexible strands relative to said cover units upon flexing of said flexible strands.

2. In combination with a belt conveyor and means for supporting the same including spaced supporting standards and spaced flexible strands mounted upon said supporting standards; a continuous cover extending longitudinally over said belt conveyor, said continuous cover including a plurality of cover units; interconnecting means for securing said cover units together, at least certain of said interconnecting means comprising means for preventing relative flexure of the cover units adjacent thereto; and support means for attaching said cover units to said flexible strands, said support means being secured to said cover units adjacent said supporting standards and engaging said flexible strands adjacent said standards, said support means supporting said cover units upon said flexible strands at the point of minimal deflection of said strands.

3. The combination as specified in claim 2 wherein said supporting standards tilt according to the flexure of said flexible strands and each of said support means for attaching said cover units to said flexible strands comprise a pair of spaced strand engaging struts disposed to either side of said standards and spaced from said standards so that normal canting of said standards is permitted and the deflection of said flexible strands to one side of said standard upon which one of said struts is mounted is compensated for by the deflection of said flexible strands to the other side of said standard upon which the other of said struts is mounted, providing a relatively stationary support for said cover.

4. In combination with a belt conveyor and means for supporting the same including spaced flexible strands; a continuous cover extending longitudinally over said belt conveyor, said continuous cover including a plurality of cover units; interconnecting means for securing said cover units together, at least certain of said interconnecting means comprising means for permitting relative flexure of the cover units adjacent thereto; and cover supporting means mounted upon said cover units and engaging said strands, said cover supporting means engaging said strands in a manner to permit flexure of said flexible strands with respect to said cover.

5. The combination as specified in claim 4 wherein said cover unit supporting means is pivotally secured to one of said flexible strands and removably secured to the other of said flexible strands, so that when access beneath the cover is desired, said cover unit supporting means may be disconnected from the removably engaged flexible strand and pivotally raised, the other of said flexible strands forming the pivot axis.

6. The combination as specified in claim 4 wherein said cover unit supporting means includes a plurality of struts secured to said cover units, said struts having at one end thereof a hook bolt for engagement with said flexible strands.

7. In combination with a belt conveyor and means for supporting the same including spaced flexible strands; a continuous cover extending longitudinally over said belt conveyor, said continuous cover including a plurality of cover units; interconnecting means for securing said cover units together, at least certain of said interconnecting means comprising means for permitting relative flexure of the cover units adjacent thereto; and support means for supporting said cover units over said belt conveyor and free from contact therewith, said support means engaging only the flexible strands of said belt conveyor and spaced along said flexible strands, permitting flexure of said flexible strands.

8. In combination with a belt conveyor and means for supporting the same including spaced flexible strands; a continuous cover extending longitudinally over said belt conveyor, said continuous cover including a plurality of cover units; interconnecting means for securing said cover units together, at least certain of said interconnecting means comprising means for permitting relative flexure of the cover units adjacent thereto; and cover unit supporting means mounted upon said cover units and engaging said strands, said interconnecting means and said cover unit supporting means cooperatively interacting to permit relative flexure of said cover in accordance with flexure of said strands.

References Cited in the file of this patent

UNITED STATES PATENTS

| | | |
|---|---|---|
| 272,006 | Webster et al. | Feb. 6, 1883 |
| 1,854,561 | Owen et al. | Apr. 19, 1932 |
| 2,038,471 | Benatar | Apr. 21, 1936 |
| 2,597,345 | Lee | May 20, 1952 |
| 2,828,851 | Thomas | Apr. 1, 1958 |
| 2,875,886 | Lo Presti et al. | Mar. 3, 1959 |
| 2,883,035 | Erisman | Apr. 21, 1959 |